(12) United States Patent
Huang

(10) Patent No.: US 8,899,842 B2
(45) Date of Patent: Dec. 2, 2014

(54) OPTICAL CONNECTOR HAVING HIGH COUPLING PRECISION

(71) Applicant: Hon Hai Precision Industry Co., Ltd., New Taipei (TW)

(72) Inventor: Po-Wei Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/968,439

(22) Filed: Aug. 16, 2013

(65) Prior Publication Data

US 2014/0314377 A1    Oct. 23, 2014

(30) Foreign Application Priority Data

Apr. 17, 2013 (TW) .............................. 102113553 A

(51) Int. Cl.
*G02B 6/38* (2006.01)
*G02B 6/32* (2006.01)

(52) U.S. Cl.
CPC ............... *G02B 6/3809* (2013.01); *G02B 6/32* (2013.01)
USPC .................................. 385/56; 385/53; 385/57

(58) Field of Classification Search
CPC .................. G02B 6/9809; G02B 6/32
USPC ....................................... 385/53, 54, 56, 59–66
See application file for complete search history.

(56) References Cited

U.S. PATENT DOCUMENTS 6,149,313 A * 11/2000 Giebel et al. .................... 385/59
6,688,782 B1 * 2/2004 Wagner et al. .................. 385/78

* cited by examiner

*Primary Examiner* — Ellen Kim
(74) *Attorney, Agent, or Firm* — Novak Druce Connolly Bove + Quigg LLP

(57) ABSTRACT

An optical connector includes a first optical-electric coupling element and a second optical-electric coupling element. The first optical-electric coupling element includes a first side surface and a second side surface facing away from the first side surface. The first optical-electric coupling element includes two position posts substantially perpendicularly extending from the first side surface. Each position post includes a connection surface substantially parallel with the first side surface. Each connection surface defines a position slot. The second optical-electric coupling element includes a third side surface facing the first side surface. The third side surface defines two position holes. The second optical-electric coupling element includes two position flanges each extending from an inner sidewall of each position hole. The position posts are inserted into the position holes to attach the first optical-electric coupling element to the second optical-electric coupling element, with the position flange inserting into the position slot.

9 Claims, 4 Drawing Sheets

OPTICAL CONNECTOR HAVING HIGH COUPLING PRECISION

BACKGROUND

1. Technical Field

The present disclosure relates to optical connectors, and particularly to an optical connector which has a high coupling precision.

2. Description of Related Art

An optical connector includes a laser diode for emitting optical signals, a first optical transmission assembly, a second optical transmission assembly coupled with the first optical transmission assembly, and a photo diode. The optical signals emitted from the laser diode enter the first optical transmission assembly, and are transmitted through the second optical transmission assembly to the photo diode, and finally can be converted into electrical signals by the photo diode.

The first optical transmission assembly includes a plurality of first coupling lenses and the second optical assembly includes a plurality of second coupling lenses for coupling the first coupling lenses to allow optimum signal transmittance. The first optical transmission assembly has to be mechanically and precisely engaged and configured with the second optical transmission assembly via a plurality of positioning holes and positioning posts to ensure the lenses are precisely aligned with the optical fibers. However, it is difficult to consistently align the positioning holes and the positioning posts together, which may result in lowered coupling precision between the coupling lenses and the optical fibers, and thus poor optical signals transmittance.

Therefore, it is desirable to provide an optical connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
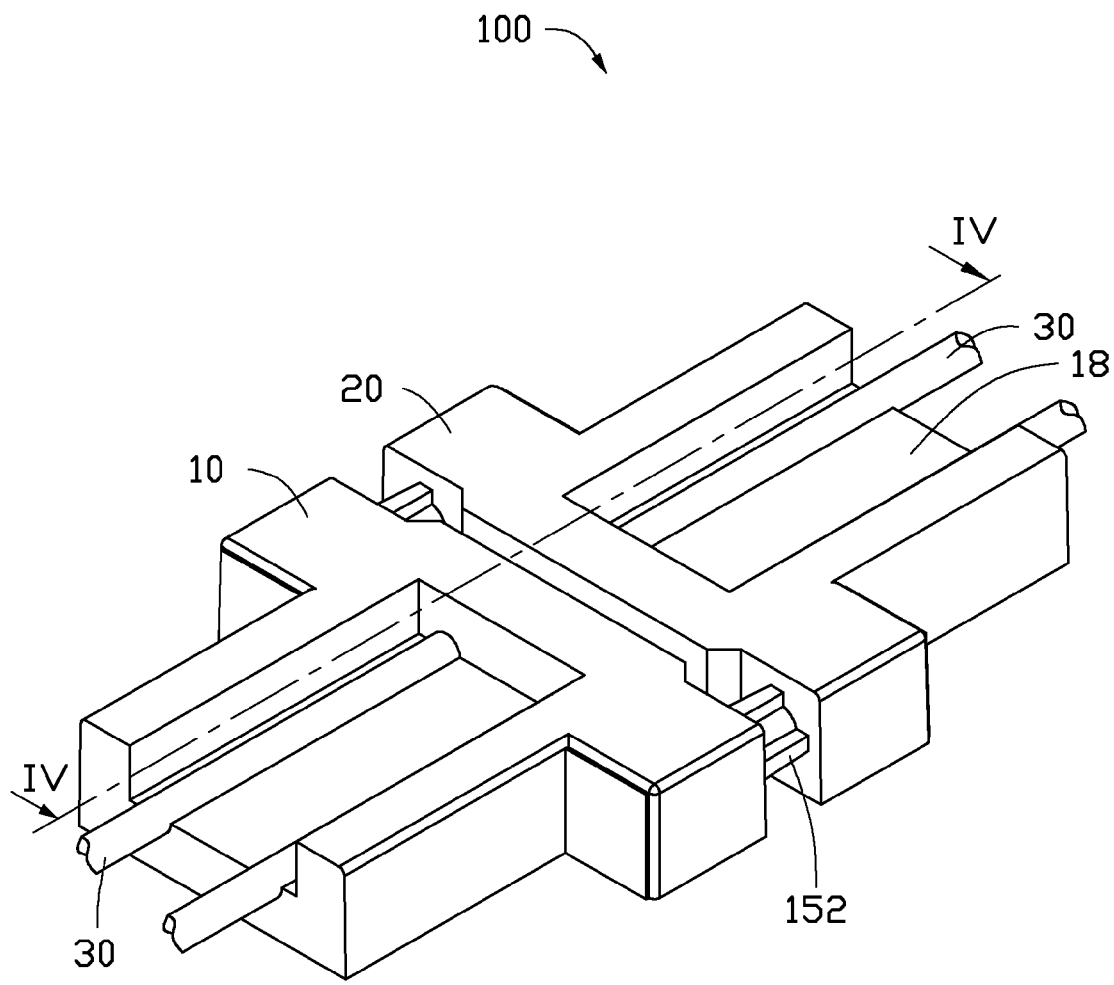
FIG. 1 is an assembled, isometric view of an optical connector, according to an exemplary embodiment.
Figure 2:
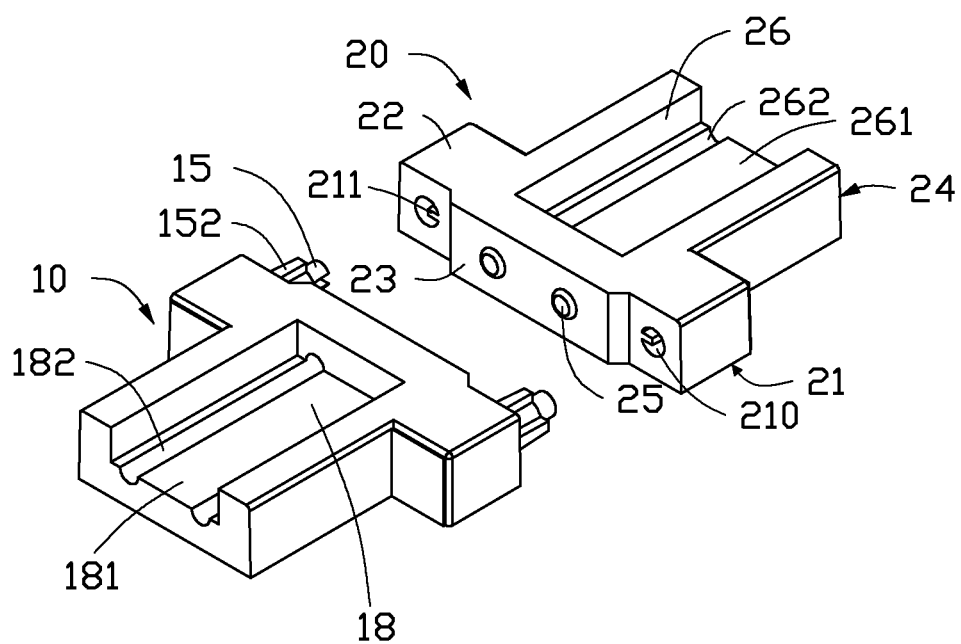
FIG. 2 is an exploded, isometric view of the optical connector of FIG. 1.
Figure 3:
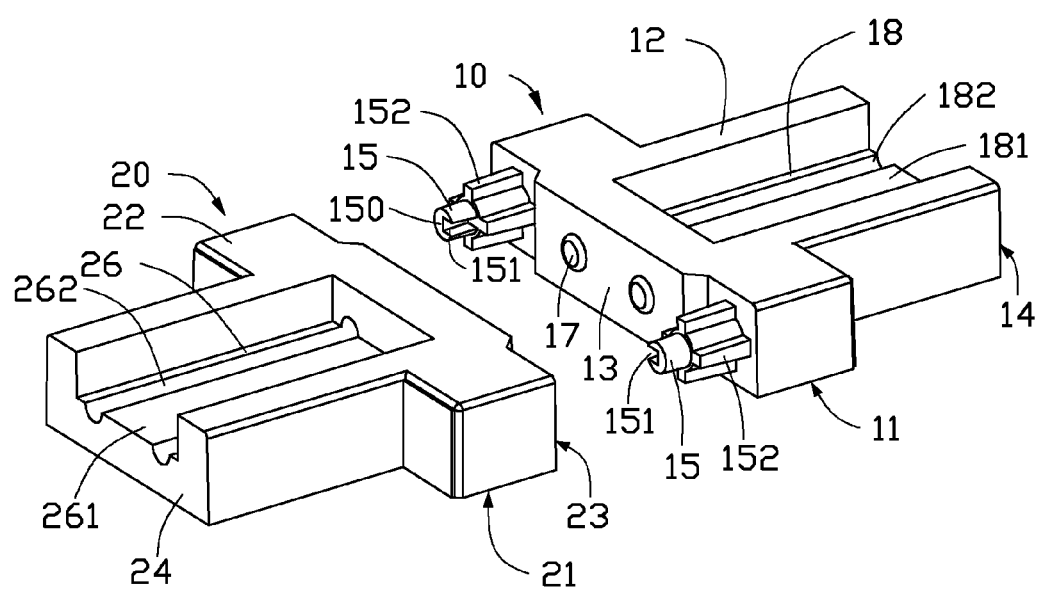
FIG. 3 is similar to FIG. 2, but viewed from another angle.
Figure 4:
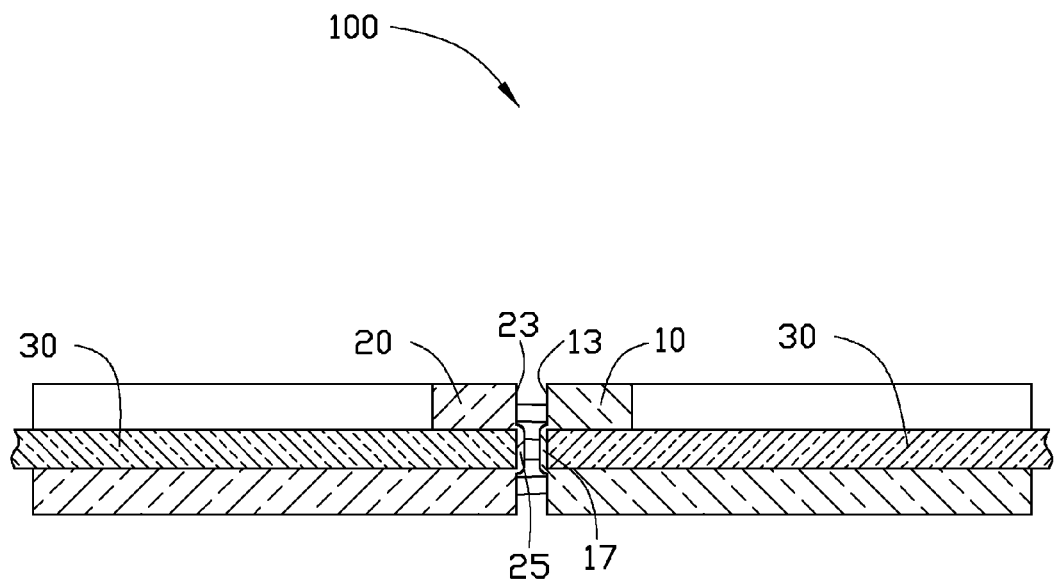
FIG. 4 is a cross-sectional view taken along line IV-IV of FIG. 1.

FIGS. 1-4 show an optical connector 100, according to an embodiment. The optical connector 100 includes a first optical-electric coupling element 10, a second optical-electric coupling element 20 detachably connected to the first optical-electric coupling element 10, and four optical fibers 30 received in the first optical-electric coupling element 10 and the second optical-electric coupling element 20.

The first optical-electric coupling element 10 is made of a transparent material, and includes a first lower surface 11, a first upper surface 12 facing away from the first lower surface 11, a first side surface 13 and a second side surface 14 facing away from the first side surface 13. The first upper surface 12 is substantially parallel with the first lower surface 11. The first side surface 13 is substantially parallel with the second side surface 14. The first side surface 13 substantially perpendicularly connects the first upper surface 12 to the first lower surface 11. The second side surface 14 also substantially perpendicularly connects the first upper surface 12 to the first lower surface 11.

Two position posts 15 perpendicularly extend upward from the first side surface 13. Each position post 15 includes a connection surface 150 substantially parallel with and distanced from the first side surface 13. A diameter of each position post 15 gradually reduces from the first side surface 13 toward the connection surface 150. The connection surface 150 defines a position slot 151. Four ribs 152 are equidistantly positioned on an external sidewall of each position post 15. The ribs 152 are located between the first side surface 13 and the position slot 151.

The first optical-electric coupling element 10 also includes two first coupling lenses 17 formed on the first side surface 13. In the embodiment, all of the first coupling lenses 17 are convex lenses and are integrally formed with the first optical-electric coupling element 10. The two first coupling lenses 17 are located between the two position posts 15.

The first upper surface 12 defines a first cavity 18. The first cavity 18 runs through the second side surface 14. The first cavity 18 includes a first bottom surface 181. The first bottom surface 181 defines a first receiving hole 182 aligning with a first coupling lens 17. An axis of the first coupling lens 17 is parallel with a lengthwise direction of the first receiving hole 182. Each first receiving hole 182 receives an optical fiber 30. In the embodiment, two optical fibers 30 are received in the two first receiving holes 182 via an adhesive.

The second optical-electric coupling element 20 is also made of a transparent material, and includes a second lower surface 21, a second upper surface 22 facing away from the second lower surface 21, a third side surface 23 facing the first side surface 13, and a fourth side surface 24 facing away from the third side surface 23. The second upper surface 22 is substantially parallel with the second lower surface 21. The third side surface 23 is substantially parallel with the fourth side surface 24. The third side surface 23 perpendicularly connects the second upper surface 22 to the second lower surface 21. The fourth side surface 24 also substantially perpendicularly connects the second upper surface 22 to the second lower surface 21.

The third surface 23 defines two position holes 210 matching with the position post 15. A position flange 211 extends from an inner sidewall of each position hole 210. The position flange 211 matches with the position slot 151.

The second optical-electric coupling element 20 also includes two second coupling lenses 25 formed on the third side surface 23. In the embodiment, all of the second coupling lenses 25 are convex lenses and are integrally formed with the second optical-electric coupling element 20. The two second coupling lenses 25 are located between the two position holes 210.

The second upper surface 22 defines a second cavity 26. The second cavity 26 runs through the fourth side surface 24. The second cavity 26 includes a second bottom surface 261. The second bottom surface 261 defines a second receiving hole 262 aligning with a second coupling lens 25. An axis of the second coupling lens 25 is parallel with a lengthwise direction of the second receiving hole 262. Each second receiving hole 262 receives an optical fiber 30. In the embodiment, two optical fibers 30 are received in the two second receiving holes 262 also via an adhesive.

When assembling, the position posts 15 are inserted into the position holes 210 as a pinch fit to firmly attach the first optical-electric coupling element 10 to the second optical-electric coupling element 20, with each first coupling lens 17 being aligned with a second coupling lens 25, and with each position flange 211 being inserted into the position slot 151. The ribs 152 are sandwiched between the first side surface 13 and the third side surface 23.

In other embodiments, the numbers of the first coupling lenses 17, the second coupling lenses 25 and the optical fibers 30 can be changed depending on need. The numbers of the first receiving hole 182 and the second receiving hole 262 will change correspondingly.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
   a first optical-electric coupling element comprising a first side surface and a second side surface facing away from the first side surface, the first optical-electric coupling element comprising two position posts substantially perpendicularly extending from the first side surface, each position post comprising a connection surface substantially parallel with the first side surface, each connection surface defining a position slot; and
   a second optical-electric coupling element comprising a third side surface facing the first side surface, the third side surface defining two position holes, the second optical-electric coupling element comprising two position flanges each extending from an inner sidewall of each position hole, wherein the position posts are inserted into the position holes to attach the first optical-electric coupling element to the second optical-electric coupling element, with the position flanges inserting into the position slots.

2. The optical connector of claim 1, wherein the first optical-electric coupling element comprises four ribs equidistantly positioned on an external sidewall of each position post, the ribs are located between the first side surface and the position slot, and are sandwiched between the first side surface and the third side surface.

3. The optical connector of claim 1, wherein a diameter of each position post gradually reduces from the first side surface toward the connection surface.

4. The optical connector of claim 1, wherein the first optical-electric coupling element comprises two first coupling lenses formed on the first side surface, the two first coupling lenses are located between the two position posts.

5. The optical connector of claim 4, wherein the first optical-electric coupling element is made of a transparent material, the first coupling lenses are convex lenses and are integrally formed with the first optical-electric coupling element.

6. The optical connector of claim 4, comprising two optical fibers, wherein the first optical-electric coupling element comprises a first lower surface and a first upper surface facing away from the first lower surface, the first upper surface is substantially parallel with the first lower surface, the first side surface is substantially parallel with the second side surface, the first side surface substantially perpendicularly connects the first upper surface to the first lower surface, the first upper surface defines a first cavity, the first cavity runs through the second side surface, the first cavity comprises a first bottom surface, the first bottom surface defines two first receiving holes each aligning with a respective one of the first coupling lenses, each of the optical fibers are received in a respective one of the first receiving holes.

7. The optical connector of claim 4, wherein the second optical-electric coupling element comprises two second coupling lenses formed on the third side surface, each first coupling lens is aligned with a corresponding second coupling lens.

8. The optical connector of claim 7, wherein the second optical-electric coupling element is made of a transparent material, the second coupling lenses are convex lenses and are integrally formed with the second optical-electric coupling element.

9. The optical connector of claim 7, comprising two optical fibers, wherein the second optical-electric coupling element comprises a second lower surface, a second upper surface facing away from the second lower surface, and a fourth side surface facing away from the third side surface, the second upper surface is substantially parallel with the second lower surface, the third side surface substantially perpendicularly connects the second upper surface to the second lower surface, the second upper surface defines a second cavity, the second cavity runs through the fourth side surface, the second cavity comprises a second bottom surface, the second bottom surface defines two second receiving holes each aligning with a respective one of the second coupling lenses, each of the optical fibers are received in a respective one of the second receiving holes.

* * * * *